Aug. 25, 1925.
S. HILLER
1,551,152
DRIER
Filed May 10, 1923   2 Sheets-Sheet 2
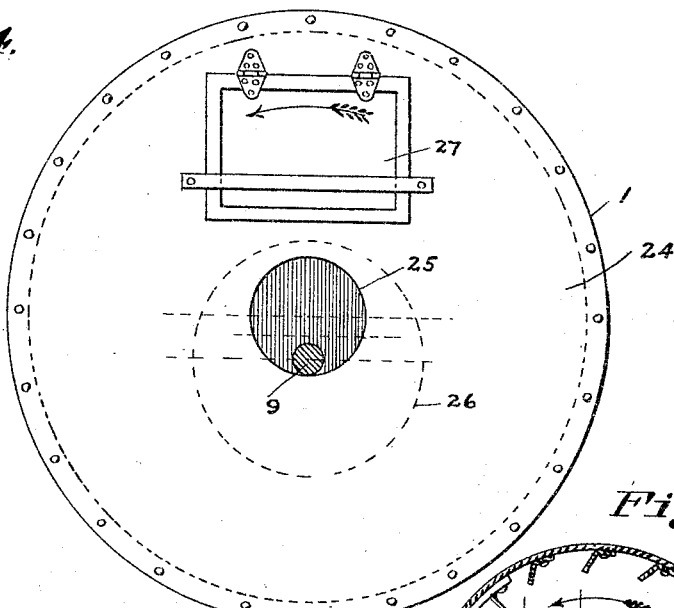
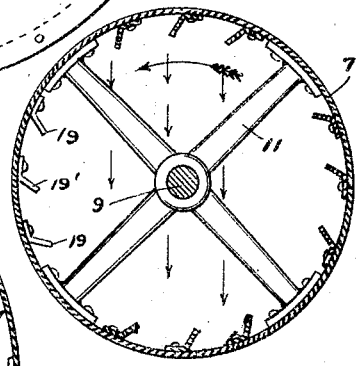
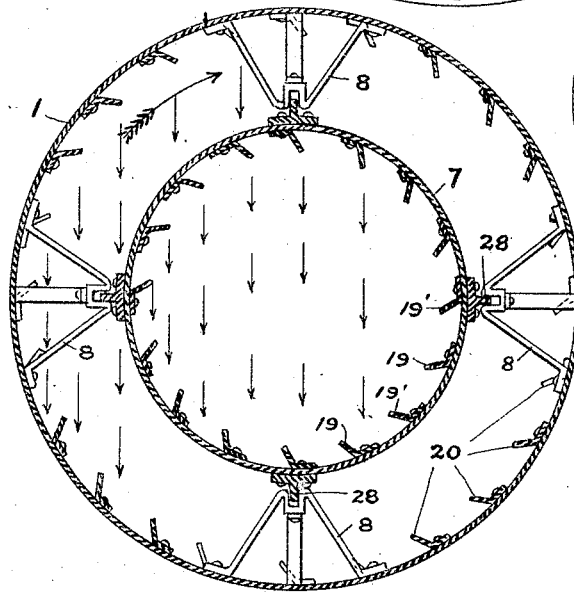
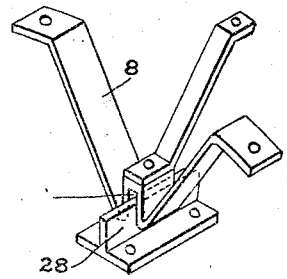

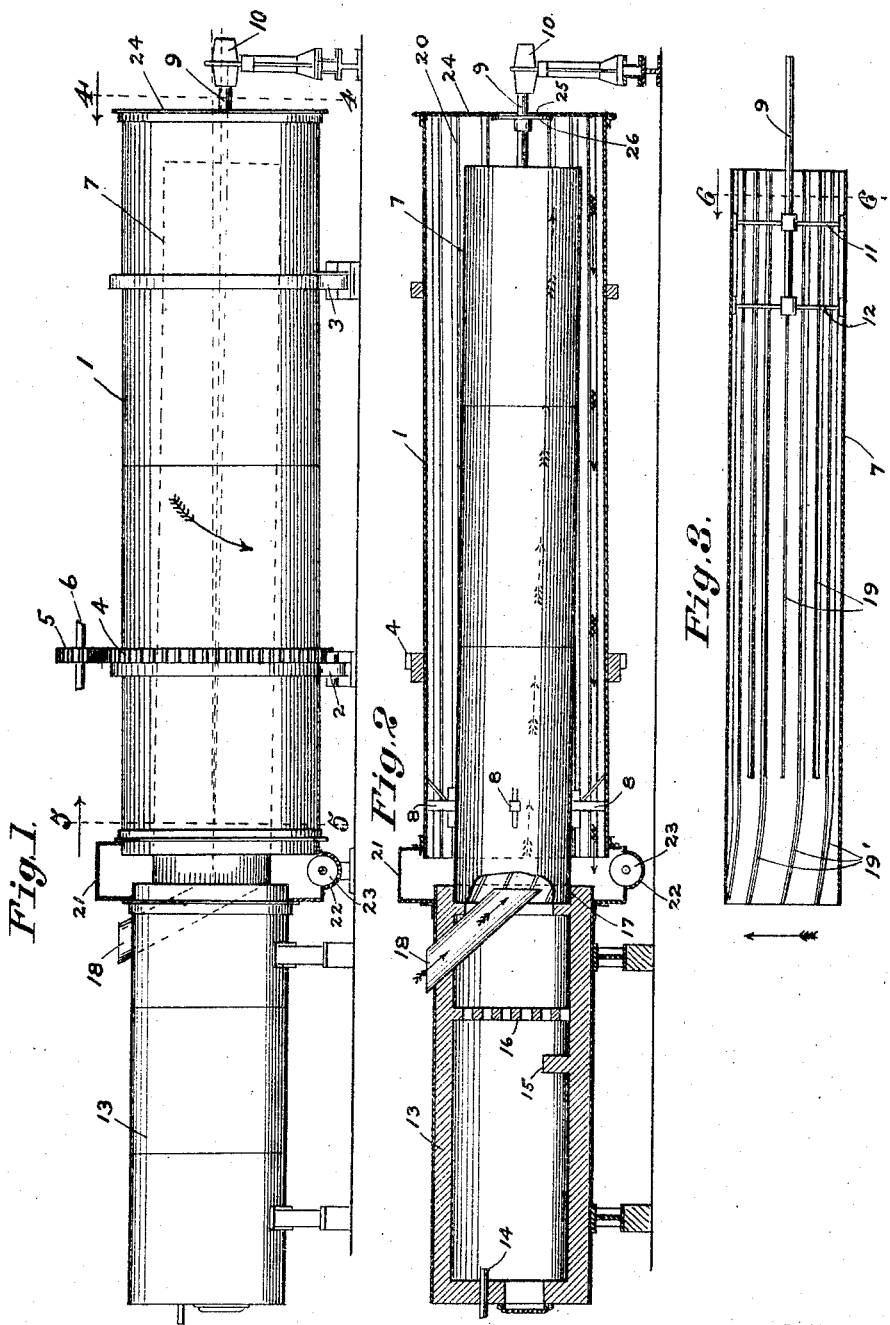

Patented Aug. 25, 1925.

1,551,152

UNITED STATES PATENT OFFICE.

STANLEY HILLER, OF SAN JOSE, CALIFORNIA, ASSIGNOR TO STANLEY HILLER, INC., OF SAN JOSE, CALIFORNIA.

DRIER.

Application filed May 10, 1923. Serial No. 638,088.

*To all whom it may concern:*

Be it known that I, STANLEY HILLER, a citizen of the United States, and a resident of San Jose, county of Santa Clara, State of California, have invented a new and useful Drier, of which the following is a specification.

This invention relates to revolving driers of the type wherein the material to be dried is passed through revolving drums and constantly dropped from the interior sides of the drums during the passage of a heated current of air through the drums.

It has for its principal objects an arrangement of drums one within the other in a way to facilitate travel of the material through the drums and a greater economy of heat in a simpler arrangement than has hitherto been effected.

In the drawings accompanying this application and forming a part hereof Figure 1 is a side elevation of my drums supported on bearings and connected to a heat generator.

Figure 2 is a longitudinal center section of Figure 1, but shows the inner drum in full, and omitting the outer drum bearings.

Figure 3 is a longitudinal section of the inner drum.

Figure 4 is an enlarged end view of the outer drum as seen from 4—4 of Figure 1, and Figure 5 a similar size cross section of it taken along the line 5—5 of Figure 1.

Figure 6 is an enlarged cross section of the inner drum as seen from the line 6—6 of Figure 3.

Figure 7 is an enlarged detail perspective sketch of the attaching brackets which secure the drums together at one end.

By further reference to the drawings the details of one embodiment of the invention will now be considered. Referring particularly to Figure 1 and also to Figure 2, the outer drum (1) is shown mounted for rotation on trunnion roller bearings (2) and (3) in the usual manner of mounting large rotating drums. The drum is slanted downward to the left slightly as shown, with the amount of slant controlled by adjusting the spacing of the low end trunnion rollers. The drum carries a ring gear (4) at one of the trunnion rings, the gear being in mesh with a pinion (5) connected through its shaft (6) to any convenient source of power for rotation of the pinion and the drum. In this particular installation the outer drum rotates in direction of the arrow.

Within the outer drum is shown a smaller drum (7). This inner drum is preferably secured to the outer drum by means of a special form of connection, embracing brackets (8) substantially centrally disposed at this point, and is slanted slightly downward toward the end furthest from the brackets so as to facilitate a gravity discharge of any contained material from the low end into the outer drum, the outer drum being slanted the reverse way to carry any such material in a return direction.

To maintain the inner drum eccentrically disposed at its low end with reference to the outer drum, a shaft support (9) projects from the inner drum and has its end revolvably supported in a bearing (10). This bearing (10) is what is known as a ball and socket adjustable floor stand, a common type of bearing providing for vertical adjustment of the bearing and self alinement. As it is a common well known device no detail of it is necessary. Its vertical adjustment permits of varying the angle of the inner drum. The shaft (9) is axially disposed and secured to the inner drum in a pair of spider arms, shown clearly in Figure 3 of the drawing at (11) and (12).

It will thus be seen that the two drums are contained one within the other and slanted slightly in reverse directions and connected together for simultaneous rotation, also that the relative slant of both drums may be selectively varied.

It may be thought that the eccentric relation shown could not be maintained during a complete cycle of rotation, but practice disproves this, for through a slight movement of the special connections between the bracket elements (8) and perhaps together with slight spring of parts the drums maintain the relation shown.

At (13) is shown a heating chamber, preferably oil fired, the end of the oil burner being indicated at (14). This chamber has an arrangement of baffles (15) and (16) and is directed to discharge its heat in the high end of the inner drum as shown, and it surrounds slightly the end of the inner drum at (17) though does not fit tight enough to prevent rotation of the drum.

Passing through the top of the heating chamber is a slanted feeding chute (18)

having its lower end well within the inner drum, so that the material to be treated may be fed by gravity through the chute and be received by the inner drum.

Referring now to Figure 3, the inner drum is provided with longitudinally disposed fins (19) some of which (19') are spirally arranged at the receiving end of the drum only, as shown, so as to assist in drawing the material into the drum upon its rotation, the direction of the spiral having relation of course to the direction of rotation of the drum. The fins are also set at an angle to successively lift and drop the material during rotation, this being shown best in the section view Figures 5 and 6, the latter figure showing one of the spider arms (11) and the supporting shaft (9) is also shown. In both Figures 5 and 6 the small arrows indicate the dropping material after being raised by the fins and it should be observed in Figure 5 that the material in the outer drum falls back to the outside of the inner drum thereby being constantly reheated.

Referring again to Figure 2, the outer drum is also provided with fins (20) similar to those in the inner drum.

Over the juncture of the heating chamber with the inner drum is shown a housing (21) having a suitable flue (not shown) for the discharge of the gases, and at the bottom a sump (22) carrying a standard screw conveyor (23) arranged transversely of the drums to carry away the dried material as it discharges from the outer drum. The housing (21) extends to and loosely surrounds the end of the outer drum so as not to interfere with its rotation.

The flow of material from chute (18) to the spiral conveyor (23) is clearly indicated by the small longitudinally pointing arrows.

The outer drum is provided with a head (24) at its high end to prevent escape of heat, and an opening therein (25) permits the oscillatory motion of this end of the outer drum around the shaft (9), a cover plate (26) on the latter serving to keep the opening closed yet permit rotation.

Figure 4 shows the end view of the outer drum, with the cover plate (26) dotted in position. At (27) is shown an optional clean out door.

Figure 5 shows in cross section the arrangement of both drums, the slanted fin plates (20), (19) and (19'), and the special attachment brackets (8), the latter being detailed further in the perspective sketch Figure 7 wherein one of the brackets (8) is shown formed with a groove (29) loosely fitting a small T iron piece (28), a construction providing for movement of the parts due to expansion of the drums through heat also changes due to the oscillatory movement of the further end.

I claim:
1. An apparatus for treating materials, comprising inner and outer rotary drums through which the material to be treated is successively passed, said drums being mounted with their axes of rotation disposed at an angle to one another.

2. In a drying apparatus of the class described, two drums mounted one within the other for simultaneous rotation, said drums being connected together at one end in substantially concentric relation and disposed eccentrically at the other, and bearings for supporting and maintaining them in said relation during rotation.

3. In a drying apparatus of the class described, two drums mounted one within the other for rotation, said drums being yieldably connected together at one end in substantially concentric relation and disposed eccentrically at the other, and bearings for supporting and maintaining them in said relation during rotation.

4. An apparatus for treating materials, comprising inner and outer rotary drums through which the material to be treated is successively passed, said drums being mounted with their axes of rotation slanted in opposite directions with respect to the horizontal.

5. An apparatus for treating materials, comprising inner and outer rotary drums, means for introducing the material to be treated into one of the drums, discharging it at the opposite end of said drum into the other drum at one end thereof and discharging it from the opposite end of said last-named drum, said drums being mounted with freedom of rotation with their longitudinal axes disposed at an angle to one another, and means for rotating the drums.

6. In a drying apparatus, a pair of drums mounted one within the other for simultaneous rotation, the inner drum projecting from one end of the outer drum and a combustion chamber with its outlet directed to the projecting end of said inner drum, a housing over the juncture of the inner drum and combustion chamber extending to the outer drum.

7. In a drying apparatus, a pair of drums mounted one within the other for simultaneous rotation, the inner drum projecting from one end of the outer drum and a combustion chamber with its outlet directed to the projecting end of said inner drum, a housing over the juncture of the inner drum and combustion chamber extending to the outer drum, a sump in the bottom of said housing, and a material conveyor arranged in said sump.

8. In a drying apparatus, a pair of drums mounted one within the other for simultaneous rotation, the inner drum projecting from one end of the outer drum and a combustion chamber with its outlet directed to the projecting end of said inner drum, a housing over the juncture of the inner drum and combustion chamber extending to the outer drum, a sump in the bottom of said housing and means in said housing for removing material collected in said sump.

9. In a drying apparatus, a pair of drums mounted one within the other for simultaneous rotation, the inner drum projecting from one end of the outer drum and a combustion chamber with its outlet directed to the projecting end of said inner drum, feeding means passing through said combustion chamber and directed into the inner drum.

10. In a drying apparatus, a pair of drums mounted one within the other for simultaneous rotation, the inner drum projecting from one end of the outer drum and a combustion chamber with its outlet directed to the projecting end of said inner drum, a gravity feeding chute passing through the top of the combustion chamber and extending into the end of the inner drum.

11. An apparatus for treating materials, comprising inner and outer rotary drums through which the material to be treated is successively passed, said drums being mounted with their axes of rotation slanted in opposite directions with respect to the horizontal, and means for varying the horizontal angular relation of the axes of the drums.

12. An apparatus for treating materials by heat, comprising inner and outer rotary drums, through which the material to be treated is successively passed, the drums being slanted in opposite directions with respect to the horizontal and with the receiving end of each drum disposed in a higher horizontal plane than the discharging ends thereof, said drums being connected together and means associated with the outer drum for rotating both drums, and means for varying the relative slant of said drums.

13. In a drying apparatus of the class described, two drums mounted one within the other for simultaneous rotation, said drums being connected together at one end in substantially concentric relation and disposed eccentrically at the other, and bearings for supporting and maintaining them in said relation during rotation, said bearings being adjustable for varying the eccentricity of the eccentrically disposed ends.

14. In a drying apparatus of the class described, an outer drum mounted for rotation on bearings, means for rotating said drum, an inner drum spaced within the outer drum, means for holding the drums in substantially concentric relation at one end, and means for holding the inner drum in eccentric relation to the outer drum at the other end, said means comprising a shaft axially disposed and secured to the inner drum and projecting therefrom, and a bearing for the end of said shaft adjustable to vary the eccentric relation above described.

STANLEY HILLER.